(12) United States Patent
Song (10) Patent No.: US 7,792,232 B2
(45) Date of Patent: Sep. 7, 2010

(54) METHOD AND SYSTEM FOR LINK JITTER COMPENSATION INCLUDING A FAST DATA RECOVERY CIRCUIT

(75) Inventor: Hongjiang Song, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 1101 days.

(21) Appl. No.: 11/170,979

(22) Filed: Jun. 30, 2005

(65) Prior Publication Data

US 2007/0002989 A1    Jan. 4, 2007

(51) Int. Cl.
*H04L 7/00* (2006.01)
(52) U.S. Cl. .................................................. 375/355
(58) Field of Classification Search ............... 375/355, 375/371, 373, 375–376; 370/516, 518
See application file for complete search history.

(56) References Cited

U.S. PATENT DOCUMENTS

| | | | |
|---|---|---|---|
| 7,349,509 B2* | 3/2008 | Ribo et al. ................ | 375/355 |
| 7,376,528 B2* | 5/2008 | Ribo ......................... | 702/108 |
| 2002/0044618 A1* | 4/2002 | Buchwald et al. ........... | 375/355 |
| 2003/0086339 A1* | 5/2003 | Dally et al. ................ | 368/202 |
| 2003/0112908 A1* | 6/2003 | Mar ........................... | 375/355 |
| 2004/0234010 A1* | 11/2004 | Wei et al. .................... | 375/346 |
| 2004/0247049 A1* | 12/2004 | Maddux ..................... | 375/327 |
| 2005/0147194 A1* | 7/2005 | Koenenkamp .............. | 375/348 |

\* cited by examiner

*Primary Examiner*—Khanh C Tran
(74) *Attorney, Agent, or Firm*—Buckley, Maschoff & Talwalkar LLC (57) ABSTRACT

A method and apparatus, in some embodiments the apparatus includes a sampler, using a plurality of sampling clocks, to sample a first set of data of an incoming data signal to determine a first phase shift indicator and to sample a second set of data of the incoming data signal to determine a second phase shift indicator, a data recovery circuit (DRC) including control logic to determine a phase control signal based on the first and the second phase shift indicators, and a phase interpolator to receive the phase control signal and adjust a phase of the sampling clocks, wherein the phase interpolator provides the plurality of sampling clocks.

16 Claims, 6 Drawing Sheets

```
┌─────────────────────────────────────┐
│ SAMPLE AN INCOMING SIGNAL TO DETERMINE │
│   A FIRST PHASE SHIFT INDICATOR USING A │
│    PLURALITY OF PHASES OF A PLURALITY │
│        OF SAMPLING CLOCKS           │
│                                 505 │
└─────────────────────────────────────┘
                  │
                  ▼
┌─────────────────────────────────────┐
│ SAMPLE THE INCOMING SIGNAL TO DETERMINE │
│  A SECOND PHASE SHIFT INDICATOR USING A │
│       PLURALITY OF PHASES OF THE    │
│    PLURALITY OF SAMPLING CLOCKS     │
│                                 515 │
└─────────────────────────────────────┘
                  │
                  ▼
┌─────────────────────────────────────┐
│    DETERMINE, USING A CONTROL LOGIC │
│  CIRCUITRY, A PHASE CONTROL SIGNAL BASED │
│       ON THE FIRST AND THE SECOND   │
│          PHASE SHIFT INDICATORS     │
│                                 520 │
└─────────────────────────────────────┘
                  │
                  ▼
┌─────────────────────────────────────┐
│   PROVIDE THE PHASE CONTROL SIGNAL TO A │
│  PHASE INTERPOLATOR TO ADJUST A PHASE OF │
│          THE SAMPLING CLOCKS        │
│                                 525 │
└─────────────────────────────────────┘
```

METHOD AND SYSTEM FOR LINK JITTER COMPENSATION INCLUDING A FAST DATA RECOVERY CIRCUIT

In PC environments, there is a continuing desire to lower costs and to increase communication link performance. This desire is present in the context of, for example, in high speed serial technology communication links and protocols that may be used to replace parallel communication links. Regarding PC architecture, the high speed serial technology communication links may include RS-232 (Recommended Standard-232C, a standard interface approved by the Electronic Industries Alliance (EIA) for connecting serial devices), Ethernet (ANSI/IEEE Std. 802.3-2002, published Mar. 8, 2002), USB 2.0 (Universal Serial Bus 2.0, released on Apr. 27, 2000), serial ATA (Serial ATA: High Speed Serialized AT Attachment, Revision 1.0a, Jan. 7, 2003), and PCI-Express (Peripheral Component Interconnect Base Specification: rev. 1.1) Gen. 1 and Gen. 2 links having 2.5 Gb/s and 5 Gb/s data rates, respectively.

Phase variations or jitter may exist on a communication link. The phase jitter may indicate a distortion of a signal caused by poor synchronization between a transmitter and a receiver resulting from various non-idealities in the circuit elements (e.g., a reference clock chip, printed circuit board traces, connectors, transmitter and receiver PLL's (phase locked loops), etc.) of the communication link components. There have been numerous attempts to reduce jitter on communication links to achieve a greater link data rate with a specified bit-error-rate (BER). However, it is typical of past efforts to address the problem of link jitter by trying to minimize the jitter at a source of the jitter by, for example, using better board materials, better board and power supply designs, a better clock chip having lower clock jitter, and better designed transmitter and receiver phase locked loops (PLL) that minimize on-chip jitter, etc. Moreover, it is costly to implement such improved materials and designs.

DETAILED DESCRIPTION

The several embodiments described herein are solely for the purpose of illustration. Embodiments may include any currently or hereafter-known versions of the elements described herein. Therefore, persons skilled in the art will recognize from this description that other embodiments may be practiced with various modifications and alterations.

Figure 1:
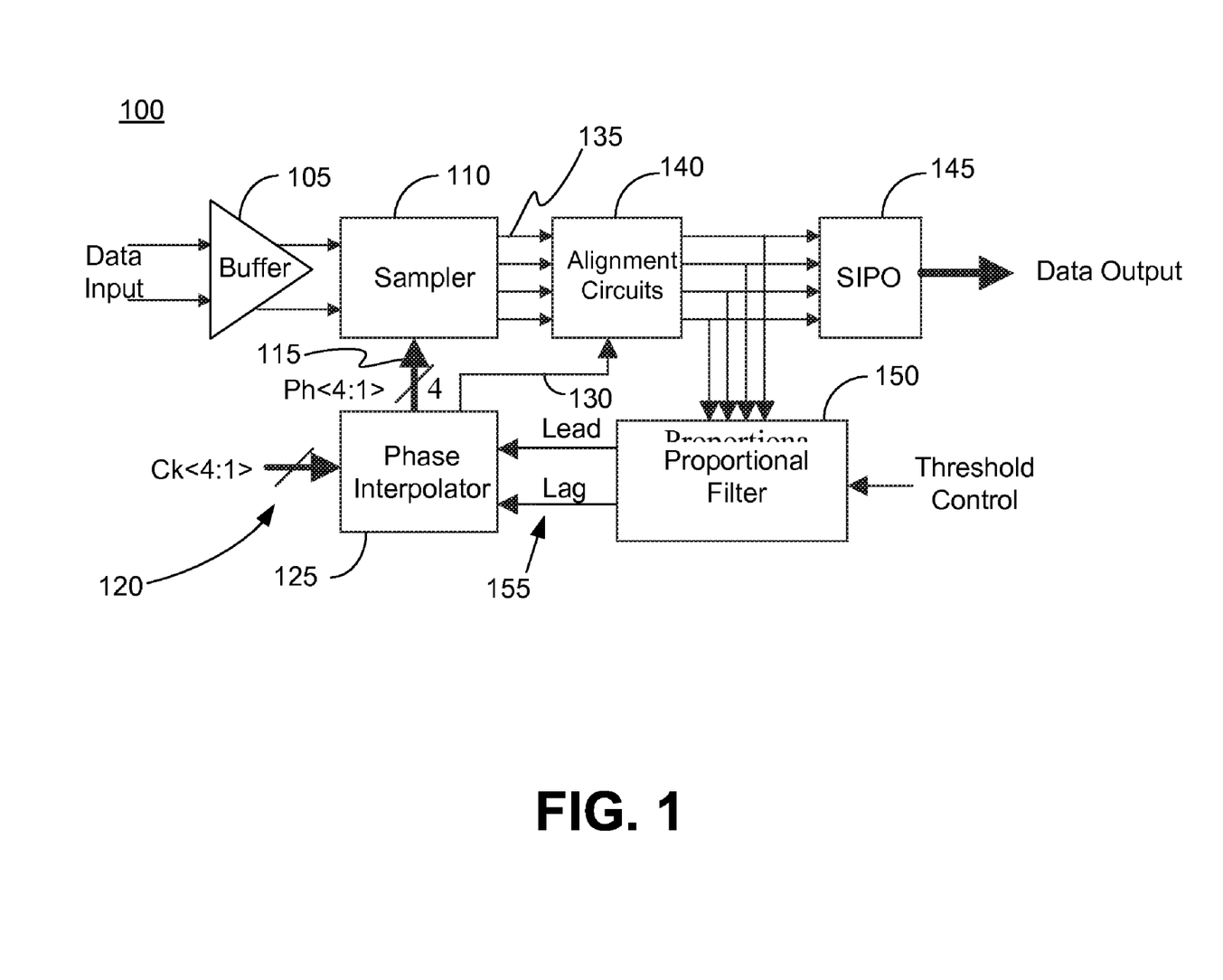
FIG. 1 is a block diagram of an exemplary circuit.

FIG. 1 is a block diagram of a receiver circuit, generally referenced by numeral 100. Receiver 100 may be an implementation of a PCI-Express® link (e.g., PCI-Express, Gen. 1 rated at 2.5 Gb/s; Gen. 2 rated at 5.0 Gb/s). Receiver 100 includes a signal buffer 105, which may be an amplifier or other signal conditioner to amplify, filter, or place the incoming data signal in a condition to facilitate processing of the signal by the receiver. Data signals from buffer 105 are provided to a sampler 110 that samples or captures a portion of the incoming data signal. Sampler 110 may store sampled signal data locally. Sampler 110 samples the incoming data signal with 4 phase interpolator (PI) output clock phase signals 115 {ph1, ph2, ph3, ph4} that are provided by PI 125. Alignment circuit 140 receives inputs of four sampled incoming data signals 135 that are sampled with the 4 PI output clock phase signals 115 and also receives an input of a PI clock phase signal 130 from PI 125. Alignment circuit 140 operates to align the sampled incoming data signals 135 with the PI clock phase signal 130. Alignment (i.e., tracking) errors from alignment circuit 140 are provided to a proportional filter 150. Proportional filter 150, using the errors generated by aligning the phases of the four sampled signals 135 with PI clock phase signal 130, operates to average the errors from alignment circuit 125 to form a control signal 155. Control signal 155 is received by PI 125 and provides an indication of whether the phase of the 4 phase output clocks of sampler 110 should be advanced (i.e., lead) or delayed (i.e., lag) so that receiver 100 is synchronized with the incoming data signal. A serial input parallel output (SIPO) converter 145 provides recovered synchronized data as an output thereof.

Operationally, the phases {ph1, ph2, ph3, ph4} of the 4 PI output clock phase signals are adaptively adjusted with respect to the fixed input reference clock 120 {ck1, ck2, ck3, ck4} such that ph1 and ph3 track a center of an eye of the incoming data signal and ph2 and ph4 track the transition points of the incoming data signal.

Receiver 100 may reduce jitter in a communication link operating at frequencies in the range of about 2.5 Gb/s. However, receiver 100 and the methods used thereby to reduce communication link jitter, may be limited at higher frequencies and may effectively be limited in a range of about (3-5) Mhz. The limited bandwidth is due, at least in part, to the averaging operations of a large number of errors processed by proportional filter 150. Also, the accuracy of receiver 100 may be compromised due to relatively large dithering that may be caused by high latency periods in the proportional filtering operations of receiver 100. The limited achievable bandwidth and high latency of receiver 100 may reduce an efficiency and/or effectiveness of the receiver at higher frequencies (e.g., above about 3 Mhz).

Figure 2:
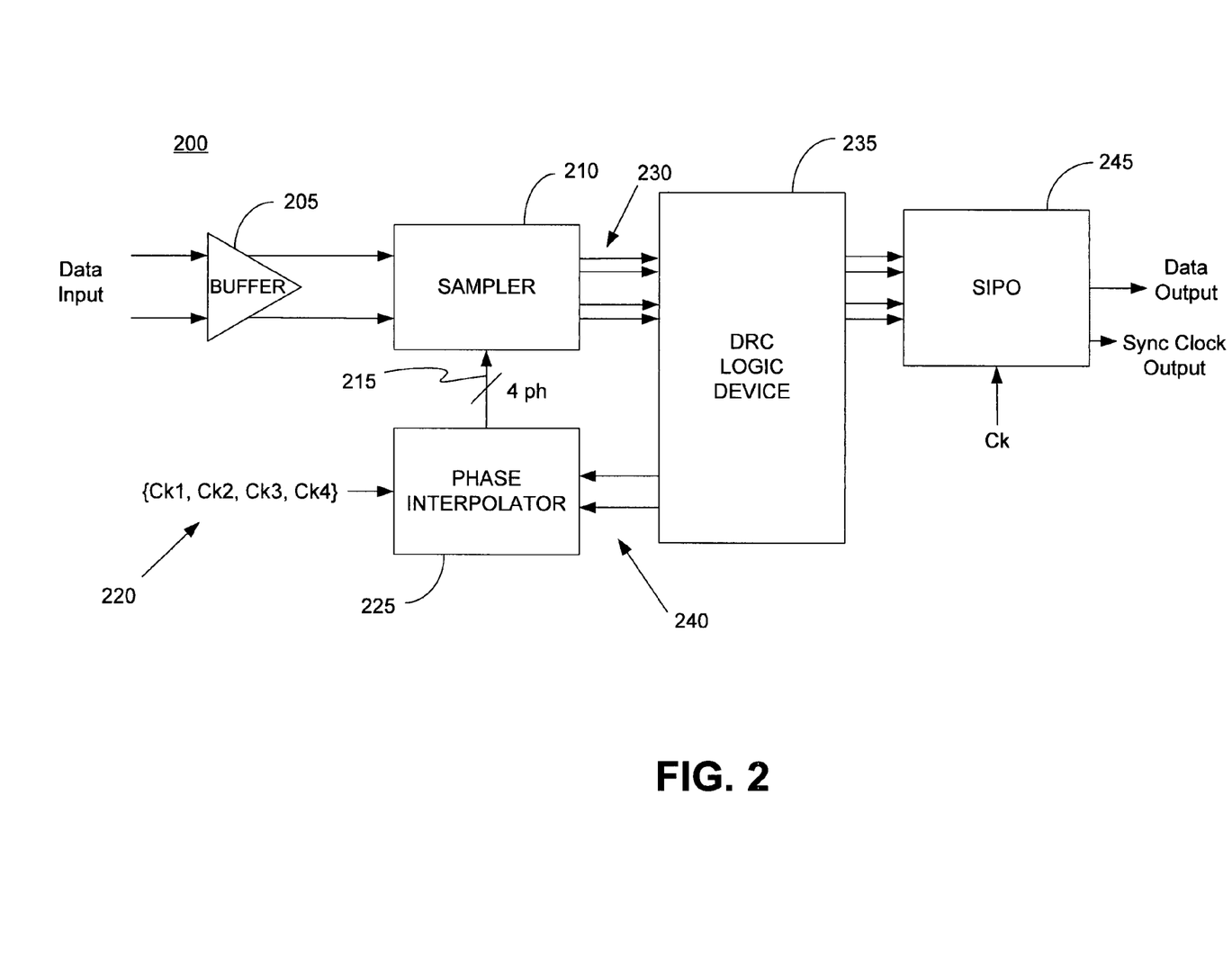
FIG. 2 is a block diagram of an exemplary apparatus, according to some embodiments hereof.

FIG. 2 is an exemplary block diagram of an apparatus 200, in accordance with some of the embodiments herein. Receiver 200 includes a signal buffer 205 that may be an amplifier, signal conditioner, or filter to amplify, filter, or place the incoming data signal in a condition to facilitate further processing of the signal by apparatus 200. Data signals from buffer 205 are provided to a sampler 210 that samples or captures a portion of the incoming data signal. Sampler 210 samples the incoming data signals using 4 PI output clock phase signals 215 {ph1, ph2, ph3, ph4} from PI 225. PI 225 derives the 4 PI output clock phase signals from reference clock signals 220. There may be about a difference of about 90° between the 4 phases of the output clocks. Sampler 210 may store sampled signal data locally. Sampler 210 samples the incoming data signal with a 4-phase clock signal 115 {ph1, ph2, ph3, ph4} that is provided by a phase interpolator (PI) 125.

Sampler 210 operates to track a center of an eye of the incoming data signal using, for example, ph1 and ph3 of the 4-phase clock signal 215 and provides indication signals of such tracking (230). Sampler 210 operates to track a transition of the incoming data signal using, for example, ph2 and ph4 of the incoming data signal and provides indication signals of such tracking (230).

A fast data recovery circuit (DRC) logic device 235 receives tracking indication signals 230 as inputs from sampler 210. Based on the received tracking indication signals, DRC logic device 235 determines phase control signals 240 that are input to PI 225. Phase control signals 240 provided to PI 225 may be determined by a combination of logic circuits. Phase control signals 240 are used by PI 225 to adjust the PI clock phases. In some embodiments herein, phase control signals 240 are used to adjust the phases of the PI output clocks by either advancing, retarding, or making no adjustments to the phases of the PI output clocks.

It can be seen in FIG. 2 that DRC device 235 does not have a direct reference clock input thereto. DRC device 235 effectively makes a determination regarding the type of phase control signal 240 to provide to PI 225 based on timing factors derived from tracking indication signals 230 of the sampled incoming signal data. DRC device 235 does not attempt to align the sampled incoming signal to a separate reference clock signal. DRC device 235 reduces the variation (i.e., jitter) of the incoming signal by making determinations based on multiples of the sampled incoming signal data.

Figure 3:
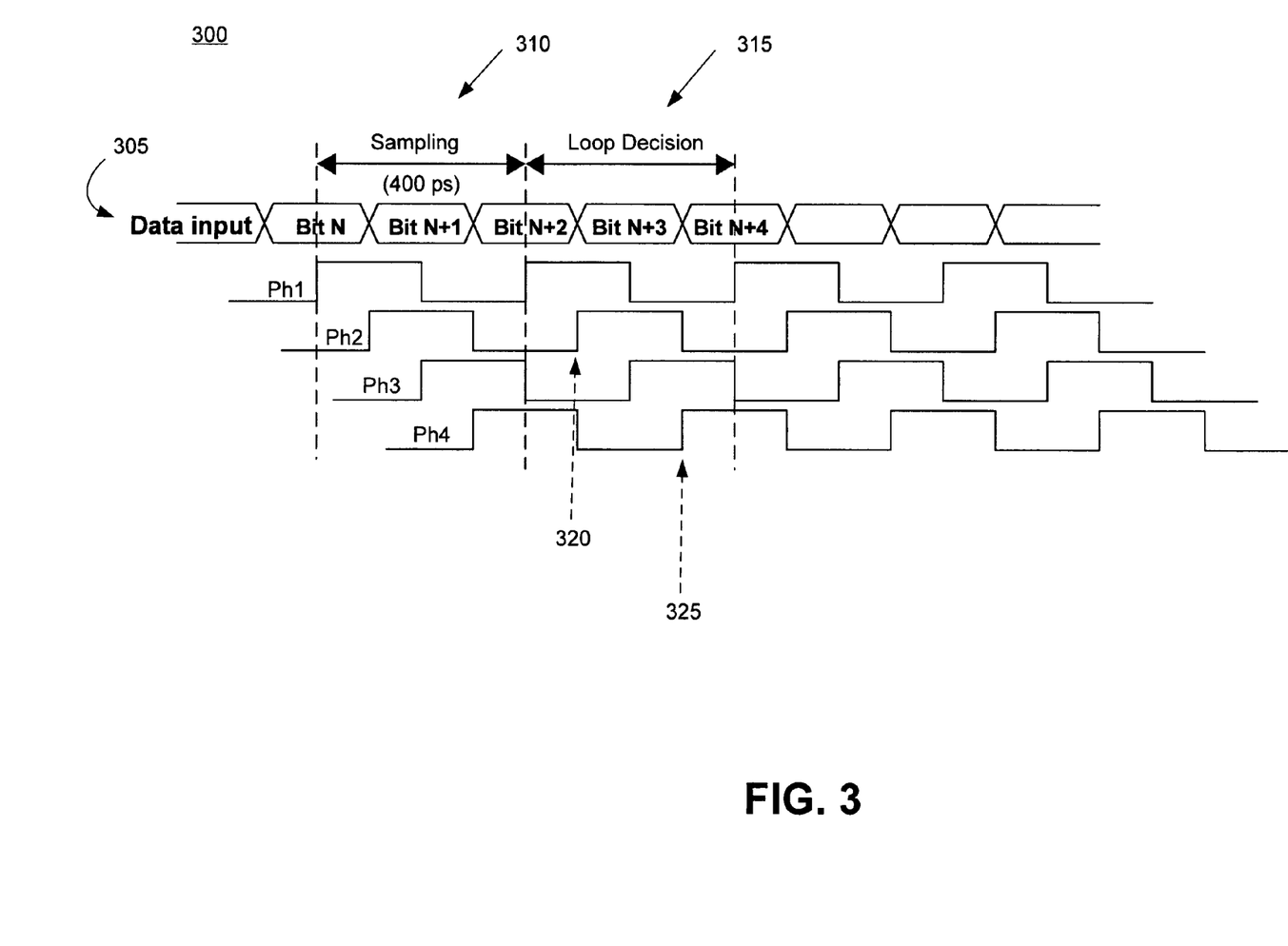
FIG. 3 is an exemplary timing diagram, according to some embodiments hereof.

FIG. 3 provides an exemplary timing diagram 300 for an apparatus and method, in accordance with some embodiments herein. As shown, incoming data signal 305 is sampled by 4 PI output clock phases {ph1, ph2, ph3, ph4}. The sampling period or unit interval (U1) for the illustrated example is 400 picoseconds (ps). As illustrated, a first triplet or set of data sampled by ph1, ph2, and ph3 is used to check an alignment of ph2 to a transition between data bit-(N) and data bit-(N+1). A second triplet or set of data sampled by ph3, ph4, and ph1 is used to check an alignment of ph4 to a transition between data bit-(N+1) and data bit-(N+2).

The processing of the first triplet of data sampled by ph1, ph2, and ph3 is done at time 320 and the processing of the second triplet of data sampled by ph3, ph4, and ph1 is done at time 325. Also, DRC logic device 235 may provide the phase control signals to the PI at time 325. The DRC logic device may provide the phase control signals to the PI at time 325 since, for example, the logic used to make a determination is relatively uncomplicated. Factors such as the DRC logic device not attempting to align (i.e., synchronize) sampled data bits with a reference clock and the shortcomings thereof (e.g., latency issues) may also facilitate relatively fast processing of the sampled signal data.

Thus, in some embodiments herein, a sampling decision (e.g., to advance, to retard, or not to adjust phases of the PI output clock signals) and updating of the control signal to the PI may be made in a single sampling period 315 as shown in FIG. 3. The DRC logic device operates directly from the output clocks of the PI, at about a rate half of the incoming data signal.

Figure 4:
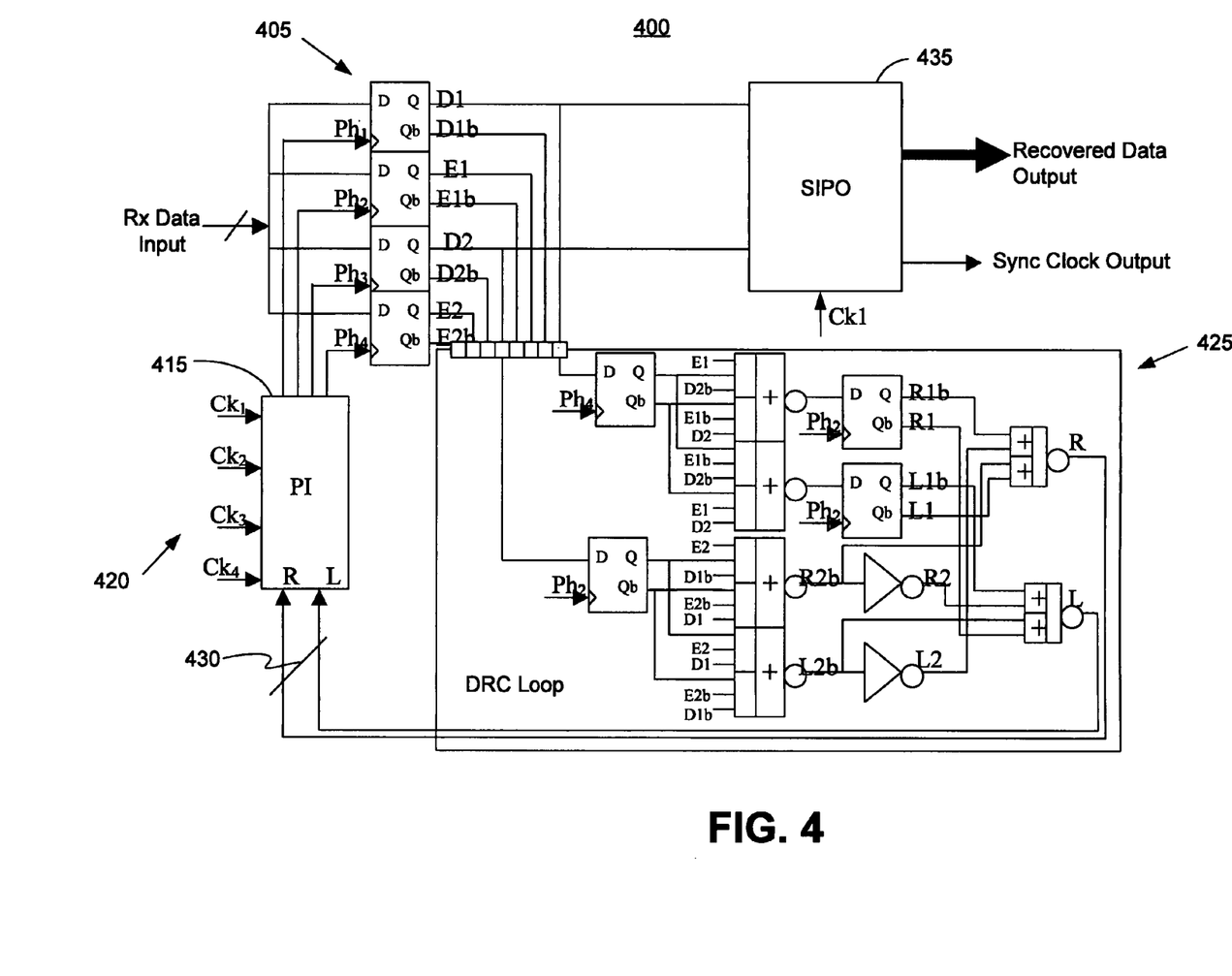
FIG. 4 is an exemplary schematic diagram of an apparatus, according to some embodiments hereof.

FIG. 4 is an exemplary implementation of an apparatus 400 including a DRC logic device in accordance with some embodiments herein. Apparatus 400 includes a sampler 405 that samples the incoming data signal with a 4 PI output clock phase signals 410 {ph1, ph2, ph3, ph4} that are provided by a phase interpolator (PI) 415. PI 415 derives the 4 PI output clock phase signals from reference clock signals 420 input thereto.

Sampler 405 tracks a center of an eye of the incoming data signal using, for example, ph1 and ph3 of the 4 PI output clock phase signals 410 and provides indication signals of such tracking (e.g., D1, D2). Sampler 405 tracks a transition of the incoming data signal using, for example, ph2 and ph4 of the incoming data signal and provides indication signals of such tracking (e.g., E1, E2).

A fast data recovery circuit (DRC) logic device 425 receives as inputs the tracking indication signals (e.g., D1, D2, E1, E2) from sampler 405. Based on the received tracking indication signals, DRC logic device 420 determines phase control signals 430 that are provided as control signal inputs to PI 415. Phase control signals 430 (i.e., R and L) may be determined by the exemplary logic circuits shown or other circuitry. The phase control signals 430 are used to adjust the PI output clock phases by providing an indication to adjust the phases of the PI output clocks by either advancing, retarding, or making no adjustments to the phases of the PI output clocks. A SIPO converter 435 connected to sampler 405 outputs recovered (i.e., synchronized) data.

Referring again to FIG. 3, the first triplet of data sampled by ph1, ph2, and ph3 is used to check the alignment of ph2 to the transition between data bit-(N) and bit-(N+1). A PI phase shift output indicator is set to (R1=1, L1=0), (R1=0, L1=1) or (R1=0, L1=0) and latched at Ph2 if ph2 leads, lags or there is no transition detection between Bit-N and Bit-(N+1) occurs, respectively. Similarly, the data triplet of ph3, ph4, and ph1 is used to check the alignment of ph4 to the next transition between data bit-(N+1) and bit-(N+2) and to set indicator {R2, L2}. The two indicators (i.e., R1, L1 and R2, L2) are combined to determine how to adjust the PI output phases.

An example of a logic table, Table 1, is provided herein below to illustrate the efficient logic that may be used in accordance with some of the methods, systems and apparatuses herein. In the table, an "X" indicates a do not car value. For example, (R=1, L=0), (R=0, L=1) and (R=0, L=0) represent phase control signals to retard, advance, or not adjusted, respectively, during updating of the phases of the PI's output clocks.

TABLE 1

| R1 | L1 | R2 | L2 | R | L |
|----|----|----|----|---|---|
| 0  | 0  | 0  | 0  | 0 | 0 |
| 0  | 0  | 0  | 1  | 0 | 1 |
| 0  | 0  | 1  | 0  | 1 | 0 |
| 0  | 0  | 1  | 1  | X | X |
| 0  | 1  | 0  | 0  | 0 | 1 |
| 0  | 1  | 0  | 1  | 0 | 1 |
| 0  | 1  | 1  | 0  | 0 | 0 |
| 0  | 1  | 1  | 1  | X | X |
| 1  | 0  | 0  | 0  | 1 | 0 |
| 1  | 0  | 0  | 1  | X | X |
| 1  | 0  | 1  | 0  | 1 | 0 |
| 1  | 0  | 1  | 1  | X | X |
| 1  | 1  | 0  | 0  | X | X |
| 1  | 1  | 0  | 1  | X | X |
| 1  | 1  | 1  | 0  | X | X |
| 1  | 1  | 1  | 1  | X | X |

Figure 5:
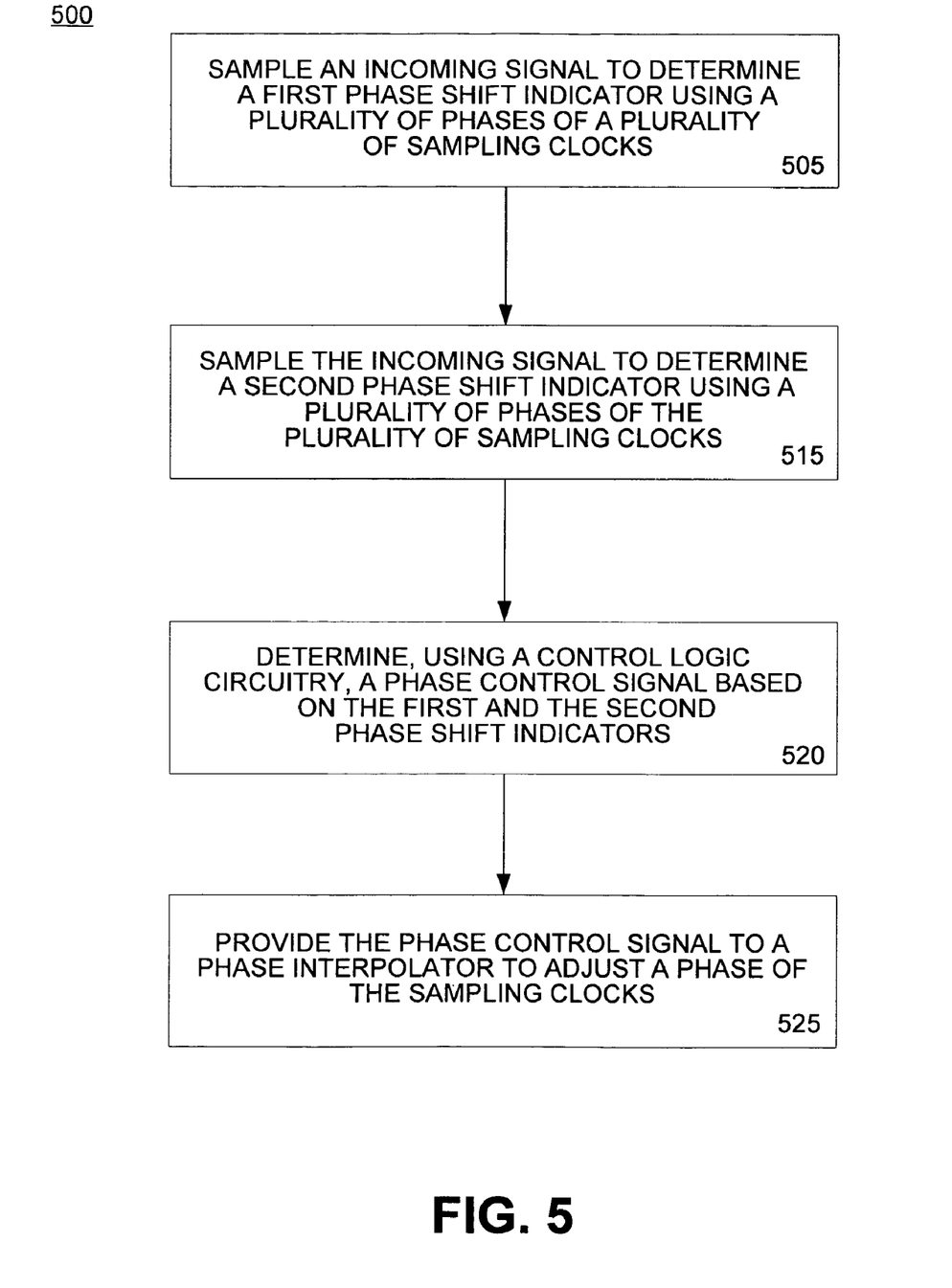
FIG. 5 is an exemplary flow diagram of a method, according to some embodiments hereof.

FIG. 5 is an exemplary flow diagram of a method in accord with some embodiments herein. At 505, a incoming data is sampled to determine a first phase shift indicator. At 510, the incoming data is sampled to determine a second phase shift indicator. The first and second phase shift indicators may track a center of an eye of a data bit of the incoming data signal and transitions between adjacent data bits of the incoming data signal using any number of methods and techniques, including but not limited to those discussed herein.

At operation 515, a determination of a phase control signal is made. The phase control signal may be used to provide an indication of whether a phase of a sampling clock should be advance, retarded, or not adjusted. The determination is based on the first and second phase shift indicators.

At operation 520, the phase control signal may be provided to, for example, a PI or other device that may be used to make fine adjustments to the sampling clocks.

Figure 6:
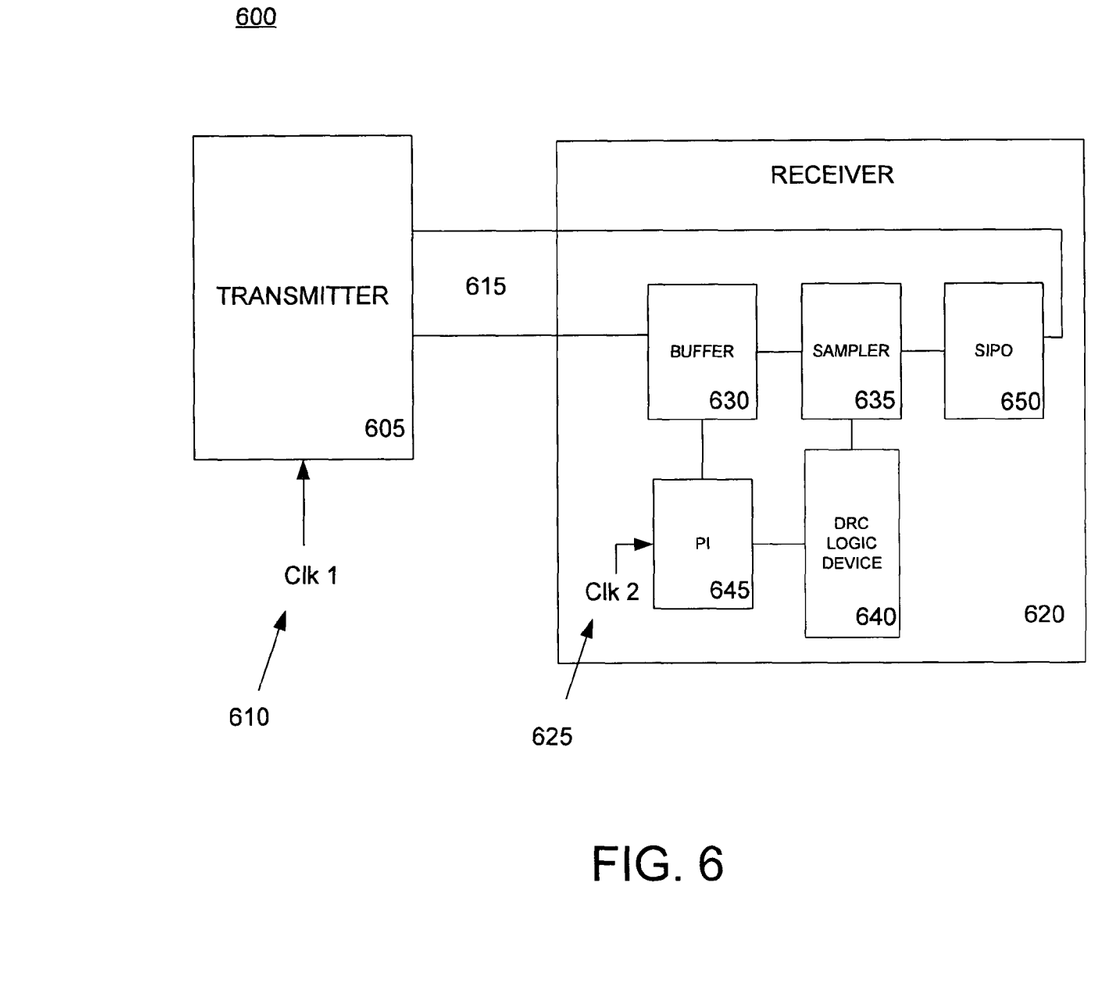
FIG. 6 is a block diagram of an exemplary system, according to some embodiments hereof.

FIG. 6 is an exemplary system 600 according to some embodiments herein. System 600 may comprise the fast DRC logic device described hereinabove. System 600 includes a transmitter 605 to transmit data synchronized to a first clock 610 over an interconnect/bus 615. In some embodiments, transmitter 605 may be a wireless transmitter that communicates via a wireless communication ink. A receiver device 630 is coupled to interconnect/bus 620 and is synchronized to a second clock 625. In an some embodiments, first clock 610 and second clock 625 may be the same clock. Receiver device 620 may include a buffer 630, a sampler 635, a DRC logic device 640, a PI 645, and a SIPO converter 650 that may operate in accordance with some of the methods and apparatuses herein. For example, buffer 630 may amplify the incoming data signal that is sampled by sampler 635 with a number of phased clocks output by PI 645. DRC logic device may determine a phase control signal in a manner such as some of the methods disclosed herein. The phase control signal may be used to adjust, if at all, phases of the PI output clocks used in sampling the incoming data signal such that a jitter or variation in the incoming data signal is reduced. The recovered data signal having a reduced jitter is passed to SIPO 650 that outputs the recovered data.

It should be appreciated that the effective bandwidth of some embodiments of some of the DRC logic devices and apparatuses herein may include frequencies in a range of about 50 Mhz to about 100 Mhz bandwidth. Also, the fast processing possible by some of the apparatuses, methods, and systems herein provide low loop latencies that may improve tracking accuracy thereof.

The foregoing disclosure has been described with reference to specific exemplary embodiments thereof. It will, however, be evident that various modifications and changes may be made thereto without departing from the broader spirit and scope set forth in the appended claims.

What is claimed is:

1. An apparatus comprising:
   a sampler, using a plurality of sampling clocks, to sample a first set of data of an incoming data signal to determine a first phase shift indicator and to sample a second set of data of the incoming data signal to determine a second phase shift indicator, wherein the first set of data is a data bit-(N) and a data bit-(N+1), and the second set of data is a data bit-(N+1) and a data bit-(N+2);
   a data recovery circuit (DRC), and not an alignment circuit and a proportional filter circuit, the DRC including control logic to determine a phase control signal based on the first and the second phase shift indicators alone and not in combination with a separate reference clock, wherein the DRC operates at about a rate half of the incoming data signal; and
   a phase interpolator to receive the phase control signal and adjust a phase of the sampling clocks, wherein the phase interpolator provides the plurality of sampling clocks.

2. The apparatus of claim 1, wherein the DRC adjusts the phase of the sampling clocks to align successive sets of data sampled from the incoming data signal.

3. The apparatus of claim 1, wherein the DRC does not align the first set of data or the second set of data with a reference clock signal.

4. The apparatus of claim 1, further comprising a serial input parallel output converter coupled to an output of the sampler.

5. The apparatus of claim 1, wherein the DRC has a processing latency of about 1 period of the incoming data signal.

6. A method comprising:
   sampling a first set of data of an incoming data signal to determine a first phase shift indicator using a plurality of phases of a plurality of sampling clocks;
   sampling a second set data of the incoming data signal to determine a second phase shift indicator using a plurality of phases of the plurality of sampling clocks, wherein the first set of data is a data bit-(N) and data bit-(N+1), and the second set of data is data bit-(N+1) and data bit-(N+2);
   determining, using a data recovery circuit (DRC) logic device and not an alignment circuit and a proportional filter circuit, a phase control signal based on the first and the second phase shift indicators alone and not in combination with a separate reference clock, wherein the DRC operates at about a rate half of the incoming data signal; and
   providing the phase control signal to a phase interpolator to adjust a phase of the sampling clocks that are provided thereby.

7. The method of claim 6, wherein the determination of the first phase shift indicator is based on a transition between data bit-(N) and data bit-(N+1), and the determination of the second phase shift indicator is based on a transition between data bit-(N+1) and data bit-(N+2).

8. The method of claim 6, wherein the DRC does not align the first set of data or the second set of data with a reference clock signal.

9. The method of claim 6, further comprising amplifying the incoming data signal prior to sampling the sampling.

10. The method of claim 6, further comprising providing a serial input parallel output converter coupled to an output of the sampler to provide a recovered data signal.

11. The method of claim 6, wherein the phase control signal provides an indication to advance, to retard, or not to adjust the phase of the sampling clocks provided by the phase interpolator.

12. The method of claim 6, wherein the DRC logic device does not receive an input of a reference clock signal.

13. The method of claim 6, wherein the DRC logic device has a processing latency of about 1 period of the incoming data signal.

14. A system comprising:
   a wireless transmitting device synchronized to a first clock; and
   a receiving device coupled to the transmitting device and synchronized to a second clock, the receiving device comprising:
   a sampler, using a plurality of sampling clocks, to sample a first set of data of an incoming data signal to determine a first phase shift indicator and to sample a second set of data of the incoming data signal to determine a second phase shift indicator, wherein the first set of data is a data bit-(N) and a data bit-(N+1), and the second set of data is a data bit-(N+1) and a data bit-(N+2);
   a data recovery circuit (DRC), and not an alignment circuit and a proportional filter circuit, the DRC including control logic to determine a phase control signal based on the first and the second phase shift indicators alone and not in combination with a separate reference clock, wherein the DRC operates at about a rate half of the incoming data signal; and a phase interpolator to receive the phase control signal and adjust a phase of the sampling clocks, wherein the phase interpolator provides the plurality of sampling clocks.

15. The system of claim 14, wherein the sampling clocks are derived from the second clock.

16. The system of claim 14, wherein the DRC adjusts the phase of the sampling clocks to align successive sets of data sampled from the incoming data signal.

* * * * *